United States Patent

Toussaint et al.

[11] 3,801,297
[45] Apr. 2, 1974

[54] PROCESS AND APPARATUS FOR DRAWING A CONTINUOUS RIBBON OF GLASS

[75] Inventors: Robert Toussaint, Balen; Henry Boonen, Westkapelle, both of Belgium

[73] Assignee: Glaverbel S.A., Watermael-Boitsfort, Belgium

[22] Filed: Oct. 10, 1972

[21] Appl. No.: 296,317

[30] Foreign Application Priority Data
Oct. 15, 1971 Luxembourg.......................... 64082

[52] U.S. Cl............................ 65/95, 65/84, 65/203
[51] Int. Cl............................................. C03b 15/04
[58] Field of Search............. 65/83, 84, 85, 95, 96, 65/203, 204

[56] References Cited
UNITED STATES PATENTS
3,231,350   1/1966   Werner et al......................... 65/83
2,693,052   11/1954   Brichard............................... 65/84

Primary Examiner—Arthur D. Kellogg
Attorney, Agent, or Firm—Spencer & Kaye

[57] ABSTRACT

In the drawing of flat glass in the form of a ribbon in a drawing chamber in which the ribbon is drawn from a molten glass bath and solidifies in the chamber, thermal heterogenieties in the chamber atmosphere are suppressed to improve the surface quality of the glass, by supplying energy which causes at least one relatively cool gas stream to be deflected upwardly and by extracting at least part of the deflected gas stream before it has substantially dispersed.

17 Claims, 8 Drawing Figures

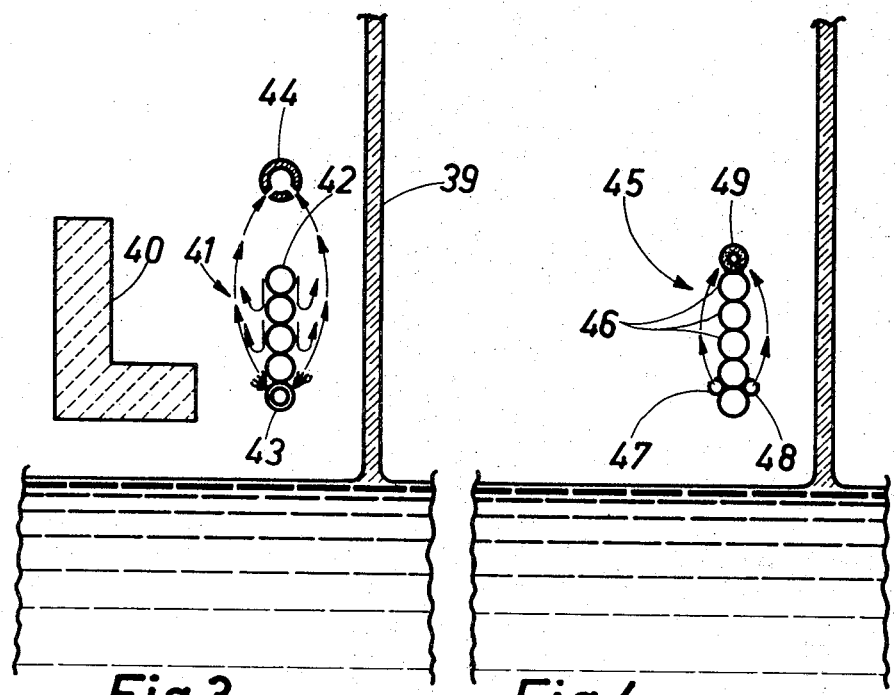
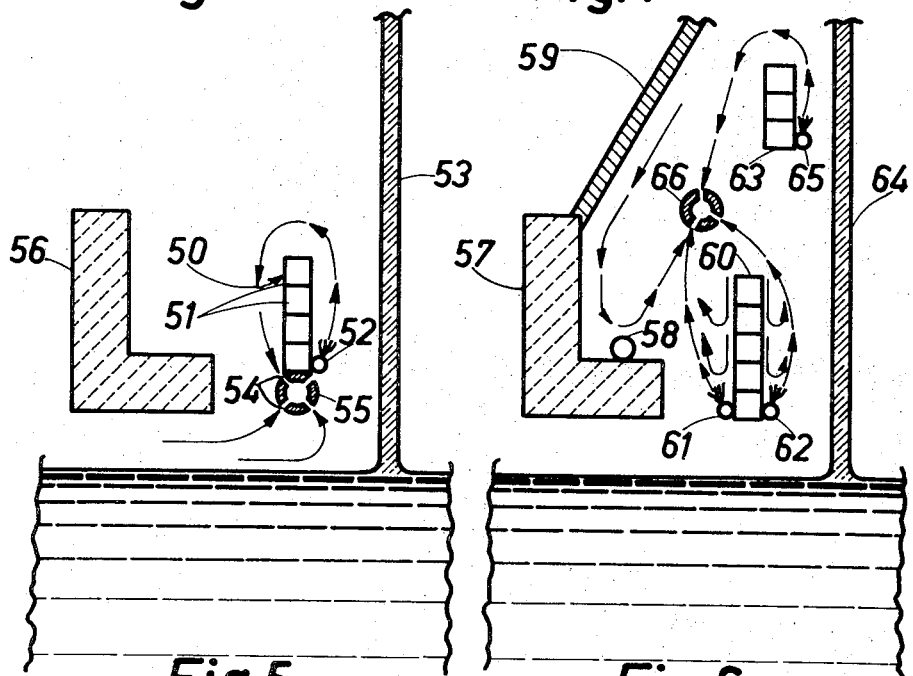
Fig.3. Fig.4. Fig.5. Fig.6.

PROCESS AND APPARATUS FOR DRAWING A CONTINUOUS RIBBON OF GLASS

BACKGROUND OF THE INVENTION

The present invention relates to a glass fabricating process, particularly one in which glass is drawn in the form of a continuous ribbon from a bath of molten glass, the ribbon being drawn through a drawing chamber in which it solidifies. The invention also relates to apparatus for carrying out the process according to the invention.

During the fabrication of flat glass by drawing, the glass is drawn in the form of a continuous ribbon through a drawing chamber in which the ribbon hardens. The ribbon is then led from the drawing chamber toward an annealing lehr in which the ribbon undergoes a further cooling before being cut into flat glass panels.

In certain processes, for example, in the standard Pittsburgh process, the glass ribbon follows a verticle trajectory through the drawing chamber and passes into a vertical annealing lehr disposed on top of such a chamber. In other processes, for example in the standard Libbey-Owens process, the glass ribbon is bent around a bending roller disposed in the drawing chamber and then enters a substantially horizontal annealing lehr.

The geometry of the glass sheet is generally affected by defects, i.e., the faces of the glass sheet are not absolutely flat and parallel at every point. Such defects reduce the quality of the glass sheet; they cause, in effect, angular deviations of light waves in such a manner that objects observed through the glass, under such conditions, appear distorted. When such glass is intended for special uses, it must have a very high optical quality and such defects are not susceptible, unless their severity is minimal.

It is known that such defects are due to an unfavorable distribution of heat in the atmosphere to which the glass is exposed within the drawing machine at locations where the glass still has a sufficiently low viscosity for it to be affected by this distribution.

It is extremely difficult to create and maintain a uniform or predetermined heat distribution in the gaseous atmosphere of the drawing machine.

The annealing lehr produces a chimney effect, i.e., it creates strong natural currents which provoke the rapid circulation of very hot convection currents along the faces of the glass ribbon from the drawing zone, where intense heat exists, through the drawing chamber and toward the annealing lehr, while gases situated in the regions adjacent the walls of the annealing lehr and of the drawing chamber are maintained at a lower temperature due to the cooling action of these walls and redescend into the drawing chamber from the annealing lehr in counter-current to such very hot gases. In addition, it is usually necessary to provide at least one cooler in the drawing chamber in order to aid the cooling of the ribbon, and this creates additional problems. Streams of cold air originate at the walls of the cooler, which has as a result that, in the absence of adequate preventive measures, streams of cold gas at different temperatures descend from the coolers and have different and varying effects both on the configuration of the gases and on the heat distribution. In processes in which the ribbon is bent around a bending roller, the local cooling action produced by a bending roller also leads to the formation of thermally heterogenous gas currents, because such bending roller must be constantly cooled by circulation of a cooling fluid through the roller in the same manner as for the previously mentioned coolers.

Another cause of uncontrolled temperature inequalities from one location to another of the gaseous atmosphere is the inevitable penetration of exterior air into the drawing chamber through openings in the refractory walls of such chamber or through incompletely closed joints between these walls and the elements passing therethrough, such as conduits intended to deliver a cooling fluid toward the cooler or coolers or to convey such fluid away therefrom.

It is well known that certain defects appearing in the geometry of the glass sheet are directly or indirectly due to the action exerted by the relatively cool gas currents existing within the drawing chamber. For example, it is well known that the presence of cool gas currents coming from a cooler located in the lower part of the drawing chamber often constitutes the principal cause for the appearance of surface defects which are present in the form of waves extending more or less parallel to the drawing direction. It is also well known that the surface defect commonly called "hammering," and which consists of an irregular distribution of surface depressions of small depth and generally having a diameter of between 1 and 4cm, is generally due to thermally heterogeneous gas currents which act on the glass ribbon in the upper part of the drawing chamber and which are created by the interaction of cold gas currents created by the auxiliary cooler in this part of the drawing chamber with the principal convection currents circulating along the faces of the ribbon due to the natural draft effect existing in the chamber.

Different solutions have already been proposed for avoiding the harmful effects discussed above and which result from the behavior of the relatively cold, and thus relatively dense, gases situated in defined regions of the drawing chamber. However, it has been found that even when these solutions are employed, the resulting glass sheets still do not possess the required surface quality.

SUMMARY OF THE INVENTION

It is an object of the present invention to overcome these drawbacks and difficulties.

A more specific object of the present invention is to provide for the control of relatively cold gas currents in order to prevent or reduce such defects in the resulting glass sheets.

The present invention is carried out in a process for fabricating glass sheets by drawing, through a drawing chamber, a ribbon of glass from a bath of molten glass, the ribbon solidifying in the drawing chamber. According to the present invention, in at least one zone in the drawing chamber, which zone is contiguous to an outer wall or to a cooling element disposed within the drawing chamber and/or which is along the trajectory of a gas current which descends or has descended into the chamber as a result of the relatively low temperature of the gas, energy is transmitted to the gaseous mass to provoke or assist its displacement toward one or several higher level zones, and this gas is drawn out of the chamber at one or several locations situated within the chamber, by a suction force which is sufficient to extract gas from at least one of the higher level zones.

One advantage of the process according to the invention is that the distribution of heat in the chamber in the immediate vicinity of the molten glass or of the ribbon is not, or is less susceptible to be affected by the presence of relatively cold gas currents. This is due to the fact that the method according to the invention causes or aids the displacement of these currents toward one or more zones where suction forces are exerted to draw at least a part of the gas of these currents out of the drawing chamber.

The combination of placing these gases in movement and thereafter drawing them off permits these operations to be performed in a much more complete and reliable manner than if only one of these operations were performed.

Preferably, a suction force is exerted in at least one of the higher level zones. It is possible in this manner to control in a more effective fashion the harmful gas currents.

Advantageously, thermal energy is transmitted to the gases in the drawing chamber to cause or aid such displacement of gas toward one or more higher level zones, such energy being, for example, produced by burning a combustible gas or by electric resistance heating means. In this manner, the harmful gaseous currents are not only oriented in the required manner, but also their temperature is raised, which permits the beneficial effect to be increased.

According to one preferred embodiment, gas is blown into the drawing chamber in at least one zone thereof in order to provoke such a displacement of gas toward one or more of such higher level zones, due above all to the kinetic energy developed by such a gas blown into the chamber.

The cold gas currents can as a result be deflected in the drawing chamber without it being necessary to introduce a supplemental heat source.

In the case where at least one cooler is provided in a drawing chamber, it is preferable to transmit the energy into at least one zone situated in such a manner as to permit such displacement of gas to be provoked toward one or several higher level zones along at least one face of such cooler.

Such a cooler is responsible for the formation of cold air streams in a zone close to the surface of a ribbon and/or the surface of the mass of molten glass and these cold air streams are liable to provoke the appearance of serious defects in the drawn glass sheet. These cold currents cannot be entirely eliminated because of the difference in temperature between the faces of the cooler and the atmosphere in which they are disposed. By provoking, in the vicinity of such a cooler, the ascending gas current as described above, and by withdrawing at least one part of the gas which has thus been subjected to an ascending movement, one avoids or reduces the risk of inducing temperature variations in the glass during its drawing.

Preferably, the energy is transmitted in a manner such as to provoke an ascending movement of gas along at least one face of such cooler which is directed toward the glass ribbon. In this case, a particularly marked improvement in the surface quality of the glass is obtained.

According to a preferred embodiment of the invention, a suction force is exerted near or above the upper part of such cooler, so as to withdraw from the drawing chamber gas which has been subjected to an ascending movement along such cooler. By exerting the suction at such a location, it is possible to directly extract from the drawing chamber gas which has been subjected to an ascending movement along such cooler, even before the gas commences to be substantially dispersed in the drawing chamber.

According to certain embodiments of the invention, a suction force is exerted near or below the lower part of such cooler so as to subject the gas which has undergone an ascending movement along one face of such a cooler to a descending movement along the opposed face of the cooler and to provoke its withdrawal from the drawing chamber.

It is sometimes particularly desirable if consideration is given to the arrangement of the elements to arrange for the suction to be effectuated at such a location. Preferably, such face of the cooler is directed toward the glass ribbon.

Advantageously, a sufficient suction force is exerted to extract from the drawing chamber, gas which has undergone an ascending displacement along such a cooler, as well as gas which has undergone a descending movement in the vicinity of an outer wall of the drawing chamber.

The apparatus can be simplified by thus eliminating at a common point extremely harmful currents coming from different parts of the drawing chamber.

The invention is particularly beneficial when it is applied for influencing the gas currents which circulate near a lower cooler situated in the lower part of the drawing chamber, since the drawn ribbon is particularly sensitive to temperature variations in this zone. However, a significant improvement in the quality of the surface of the glass sheet is obtained when the invention is applied for influencing gas currents adjacent a cooler situated in the upper part of the drawing chamber.

Preferably, when at least one upper cooler and at least one lower cooler are provided, energy is transmitted into zones such as to provoke such displacement of gas toward one or several higher level zones along at least one face of such lower cooler and of such upper cooler and a suction force is exerted in at least one zone to simultaneously extract at such zone quantities of gas which are thus displaced along such upper and lower coolers. The practice of the invention in a manner such that the gas current is favorably influenced in proximity at the same time to the upper cooler and the lower cooler, is thus simplified.

The invention also concerns an apparatus permitting the practice of the above-described process. The apparatus according to the invention essentially includes means for transmitting energy to the gas in the drawing chamber in at least one zone of the chamber adjacent an outer wall or adjacent a cold element within the drawing chamber and/or which is located along the trajectory of gas which descends or has descended into the chamber due to the relatively low temperature of such a gas, so as to provoke or aid the displacement of such a gas toward one or more higher level zones, and further includes means for drawing gas out of the drawing chamber, these drawing means including an inlet orifice situated in an appropriate manner to extract gas from at least one such higher level zone.

This apparatus presents the advantage that it permits the drawing of a glass ribbon which is less susceptible to be affected by defects due to the behavior of the cold gas currents within the drawing chamber.

Reference will now be made to various embodiments of the apparatus according to the invention. A large number of them are for the purpose of achieving the process features already described. The advantages of the other embodiments will be better appreciated from that which has already been stated about the corresponding process embodiments.

Advantageously, the means for transmitting energy are constituted by means for blowing gas into the drawing chamber. According to one embodiment of the invention, these means for transmitting energy to the gas are burners for burning combustible gases.

As a modification, the means for transmitting energy to the gas are electric resistance heating means.

Preferably, when at least one cooler is provided in the drawing chamber, the means for transmitting energy are disposed in an appropriate location for provoking such displacement of gas toward one or more higher level zones by causing them to rise along at least one face of such cooler.

According to another particularly desirable embodiment, the means for transmitting energy are disposed in appropriate manner to provoke such ascending displacement of the gas along at least one face of such cooler, which face is directed toward the glass ribbon.

Advantageously, the means for transmitting energy are situated effectively at, or incorporated in, the cooler itself, or at each cooler.

According to one advantageous embodiment of the invention, the withdrawing means include an inlet orifice situated alongside or above the upper part of such a cooler.

Preferably, the inlet orifice of the withdrawal device is disposed against the or each cooling element.

It is also advantageous to dispose the inlet orifices of the withdrawal device on the or each of the cooling elements. Preferably, they are disposed within the or each cooling element.

According to a modified embodiment, the means for transmitting energy are disposed in an appropriate manner in zones such as to provoke an ascending movement of gas along one face of the cooler and the withdrawal means include an inlet orifice which is situated in an appropriate manner to provoke the descending displacement of such a gas along the other face of such cooler. In this case, the outlet extremity of the means for transmitting energy and the inlet orifice for the withdrawal means can be installed at the same level.

In a preferred embodiment there is provided, at least to one side of the path of the ribbon, at least one lower cooler situated in the lower part of the drawing chamber and at least one upper cooler situated in the upper part of the drawing chamber, and the means for transmitting energy are disposed in an appropriate manner in zones such as to provoke such a displacement of gas toward one or several higher level zones along at least one face of the lower cooler, as well as along at least one face of the upper cooler, the withdrawal means presenting an inlet orifice disposed in an appropriate manner to permit the extraction of quantities of gas, which are thus displaced along the upper and lower coolers. If necessary, the outlet of the energy transmitting means, as well as the inlet orifice for the withdrawal means, can be disposed at the same side of the or each cooler.

In numerous embodiments of the invention, the withdrawal means which are arranged within the drawing chamber, include one or more tubes having inlet orifices along their periphery. In a modification, use can be made of one or more tubes having a porous wall.

Advantageously, the means for transmitting energy and for withdrawing gas in the drawing chamber include a number of distinct sections juxtaposed so as to act in a selective manner on different zones distributed across the width of the ribbon, and with individually selected intensities suitable to the conditions existing in each zone.

BRIEF DESCRIPTION OF THE DRAWINGS

FIG. 3 is a partial longitudinal cross sectional view of a drawing chamber showing another embodiment of means according to the invention.

FIG. 4 is a view similar to that of FIG. 3 showing a further embodiment of means according to the invention.

FIG. 5 is a view similar to that of FIG. 3 showing still another embodiment of means according to the invention.

FIG. 6 is a view similar to that of FIG. 3 showing yet another embodiment of means according to the invention.

DESCRIPTION OF THE PREFERRED EMBODIMENTS

Figure 1:
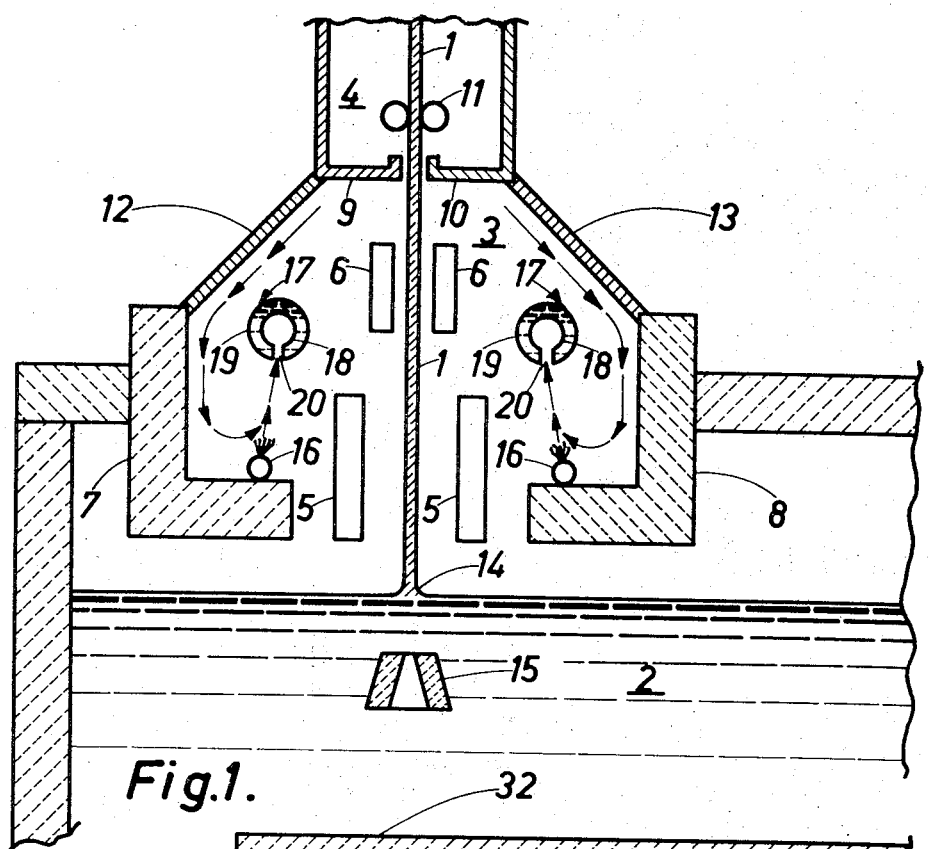
FIG. 1 is a longitudinal, cross sectional view showing a drawing chamber through which a continuous glass ribbon is drawn and provided with one embodiment of means for carrying out the present invention.

FIG. 1 shows one embodiment according to the invention in the drawing chamber of apparatus for drawing a glass ribbon according to the Pittsburgh process.

The glass ribbon 1 is drawn from a bath 2 of molten glass through a drawing chamber 3 atop which is disposed an annealing lehr or drawing machine 4. The chamber contains, in a standard manner, principal coolers 5 and auxiliary coolers 6. The sides and bottom of the chamber are bounded by L-shaped blocks 7 and 8, while the upper extremity of the chamber is bounded by catch pans 9 and 10 which separate it from the drawing machine 4 in which the ribbon is drawn vertically by rollers 11. The drawing chamber is also limited by lateral walls 12 and 13 joining the upper part of the blocks 7 and 8 to the extremities of catch pans 9 and 10.

The glass bath 2, from which the ribbon 1 is drawn, contains, beneath the miniscus 14, a forming piece 15 immersed in the glass bath and called in this apparatus a draw bar.

According to the invention, rows of combustible gas burners 16 are disposed in the path of cold currents descending from walls 12 and 13 along the interior vertical face of L-blocks 7 and 8. The flame coming from the orifices of each row of burners 16 are directed in such a manner that the hot currents which they create are spaced from the zones near the surface of the glass bath. The cold currents which descend along the walls are entrained by these ascending currents and are thus deflected from their normal trajectory. The two types of gaseous currents mix to form a gaseous current which is displaced in a direction imposed by the flames. However, after a certain distance, the current of mixed gases will have a tendency to disperse through the atmosphere of the drawing chamber. To avoid the harmful effect of this dispersion. The inlet orifice of a withdrawal element 17 is disposed in the path of these gas currents, for example, as indicated in FIG. 1, at a location where the effects of this dispersion have not yet been able to be noted. The withdrawal element 17 is, for example, a channel 18 which is cooled by circulation of water in a water jacket 19 completely surrounding the channel but leaving, however, one or more openings 20 spaced longitudinally along the channel and oriented toward the gaseous currents which consequently assumes the general configuration shown by the totality of arrows. The inlet for the channel 17 is connected to known suction means disposed outside of the drawing chamber and not shown in the drawing.

Figure 2:
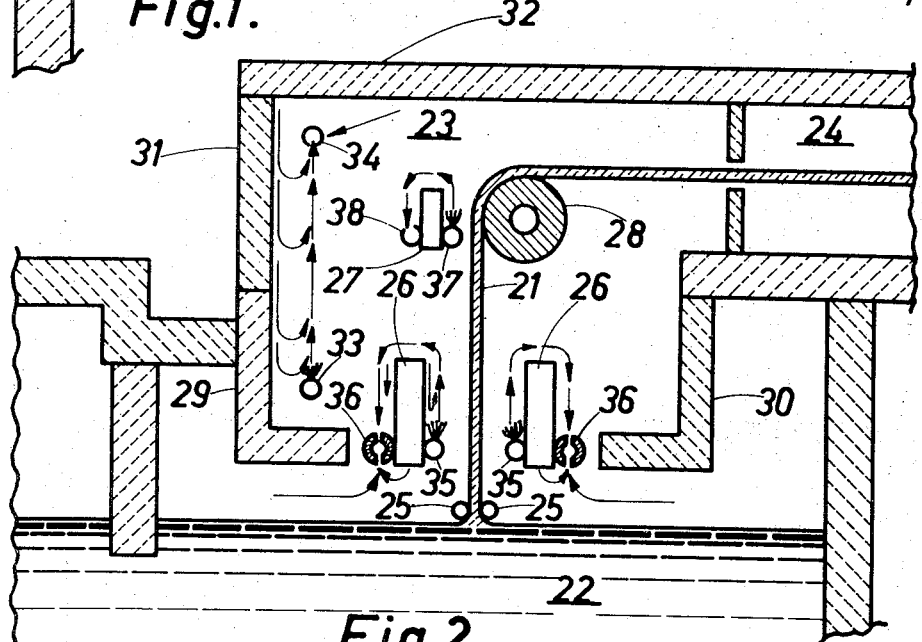
FIG. 2 is a view similar to that of FIG. 1 of another type of drawing chamber provided with another embodiment of means for carrying out the invention.

FIG. 2 shows an apparatus for drawing a continuous glass ribbon according to another fabrication process during which the glass ribbon, after having been drawn vertically is bent into a horizontal orientation by a bending roller.

In FIG. 2 the ribbon 21 is formed from the surface of a glass bath 22 and is drawn in a drawing chamber 23 toward a horizontal annealing lehr 24. The drawing chamber 23 contains, as is standard for this process, edge rollers 25 maintaining the width of the ribbon 21 constant, principal coolers 26 situated to one side and the other of the glass ribbon, and at least one auxiliary cooler 27 located substantially at the height of the bending roller 28, but at the other side of the ribbon therefrom. The glass ribbon is curved around the bending roller and then follows a substantially horizontal path. The drawing chamber also includes refractory blocks 29 and 30, for example in the L-form shown in FIG. 2, and it is closed to the outside by walls 31 and 32.

Walls 31 and 32 are the source of cold currents which there arise and descend along, for example, wall 31. At the bottom of this vertical wall 31 and at the top of L-block 29, there is disposed a row of gas burners 33 whose flames are directed substantially parallel to the wall 31 and at a certain distance from that wall. The cold gases which descend adjacent wall 31 are entrained vertically upwardly by the ascending currents of hot gases provoked by the flames, so as to have a flow configuration such as that shown generally by the totality of arrows. In the upper zone of the drawing chamber 23, substantially above the row of burners 33, there is disposed the inlet element 34 for the withdrawal means (not shown), through which the gaseous currents are withdrawn in such a manner as to form a stable gaseous current, since the two extremeties of this current are fixed, thus isolating the wall 31 from the remainder of the drawing chamber.

On the walls of the cooler 26 there also arise cold currents which have a tendency to descend toward the glass bath and to form, with the ascending hot currents coming from the bath, mixtures which are thermally heterogenous and which are difficult to control. There is disposed at the bottom of the principal cooler 26 at the face directed toward the ribbon 21, a row of burners 35 directing flames toward the top along the cooler wall. At the bottom of the other wall of cooler 26 there is disposed a cylindrical channel 36 having two series of orifices distributed along two generatrices of the channel. A first series of orifices is directed toward the top, the second series of orifices being directed toward the bottom of the cooler. The gaseous currents created by the row of burners 35 rise while flowing along the cooler wall and then descend along the other wall under the influence of the withdrawal means 36.

The second series of orifices is, for example, intended to withdraw currents of cold gases originating beneath the cooler, at the same time as currents of hot gases coming from the glass bath and is intended therefore to maintain the zone of the glass bath near the base of the ribbon in an atmosphere free of thermally heterogeneous gaseous currents.

There is thus obtained, in the end, all around the cooler an envelope of hot gases which completely surround the cooler and which force the cold currents which there originate to follow a predetermined path which separates them, or maintains them beyond the vicinity of, the ribbon and/or the glass bath.

Although this arrangement according to the invention can be utilized only on the coolers and also independently of the curtain created by means 33 and 34, FIG. 2 shows an embodiment in which such device has been applied to the auxiliary cooler 27, which is provided at its front wall, i.e., directed toward the ribbon, with a row of burners 37 and, on its rear wall, with a channel 38 by which the gaseous currents are withdrawn.

Finally, in the case of FIG. 2, the different sources of cold gaseous currents are separately isolated by different hot gaseous currents which assume the general configuration represented by the totality of arrows.

FIG. 3 shows very schematically part of a drawing chamber located in the drawing zone and shows a modification of the invention. Between the glass ribbon 39 and the L/block 40 there is disposed a cooling element 41 composed of pipes 42 traversed by a fluid, for example water. This cooling element 41 which extends across the entire width of the ribbon, also includes a row of burners 43 forming a unit with the cooler and whose flames are directed toward the top, to one side and to the other of the cooler. In a zone adjacent the upper part of the cooler there is disposed a channel 44 of the same type as that described with reference to FIGS. 1 and 2 and connected to known suction means which are not shown.

The injection of flames toward the top, to one side and the other of cooler 41 by means of the row of burners 43 forming part of the cooler, provokes the emission of hot gas currents, which, while ascending along the walls of the cooler, entrain the cold descending currents produced by the cooler walls and which therefore assume the configuration shown by the totality of arrows. Before arriving at the vicinity of the zone of their dispersion, they are drawn by the channel 44, which evacuates them towards the exterior of the drawing chamber.

In the embodiment illustrated in FIG. 4, the cooling element is composed of a certain number of types 46 traversed by a fluid such as water. At the bottom of the cooler are disposed two rows of outlets 47 and 48 each situated on a respective longitudinal face of the cooler and injecting hot gases which act in the same manner as the flames emitted by the burners of FIG. 3. The upper pipe 49 of the cooler is a channel whose walls are porous and which is constituted as a withdrawal unit. This channel 49 is connected to suction means situated outside of the drawing chamber and not shown on the figure.

The channel 49 with porous walls permits withdrawal in all directions and particularly permits combination effects.

In the embodiment shown in FIG. 5, the cooler 50 is composed of juxtaposed caissons traversed by a cooling fluid. A row of gas burners 52 situated at the bottom of the cooler wall directed toward the glass ribbon 53 delivers flames along this wall. Under the cooler there is attached a withdrawal unit 55 which has different rows of orifices 54 directed toward the gaseous currents. Such rows are provided, for example, to withdraw the gaseous currents which have been deflected by the flames of the row of burners 52 and which then descend along the rear wall of the cooler. There are also provided rows of orifices disposed in such a manner as to also withdraw gaseous currents coming from the zone between the glass bath and the lower face of the L-block 56.

FIG. 6 shows schematically a combination of different devices according to the invention. On the L-block 57 there is disposed an electric resistance 58 which provokes or aids the deflection of cold currents descending along the wall 59. In addition to each side of the principal cooler 60 there are disposed, in a manner already described, two rows of burners 61 and 62 delivering flames in such a manner as to deflect upwardly the cold current arising at the cooler. In the same manner, the auxiliary cooler 63 carries at its face directed toward the ribbon 64 a row of burners 65 which deflect upwardly the cold currents produced at that wall, these cold currents then descending along the rear wall of the cooler 63.

All of the gaseous currents which have thus been deflected converge toward the same zone of the drawing chamber where they commence to disperse. At this location there is disposed a channel 66, of the type already described, which withdraws all of these currents to deliver them outside of the drawing chamber.

Figure 7:
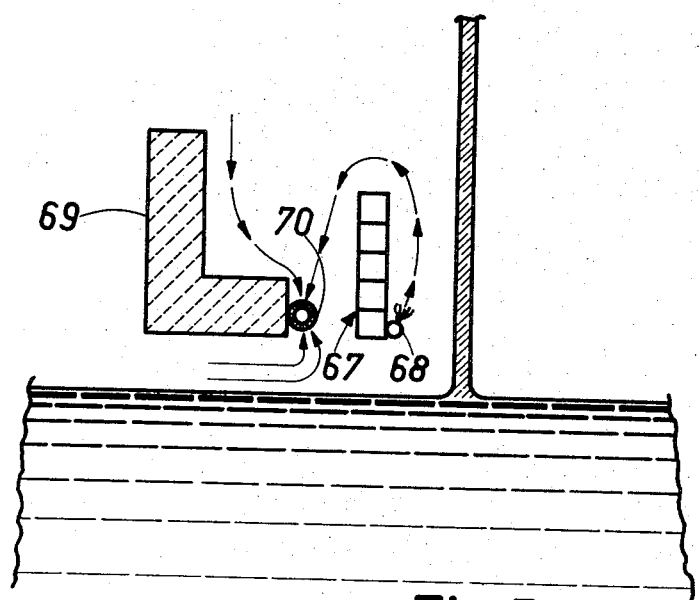
FIG. 7 is a view similar to that of FIG. 3 showing a further embodiment of means according to the invention.

FIG. 7 shows schematically a modification in which the gaseous currents flowing along the front wall of the principal cooler 67 are deflected by the flames produced by a row of burners 66 and then descend along the wall of the cooler 67. The L-block 69 carries on its front wall a channel 70 having a porous wall and through which are withdrawn not only the gaseous currents which have been thus deflected, but also the gaseous currents descending from the wall of the chamber and a portion of the currents coming from the zone between the glass bath and the L-block.

The totality of FIGS. 3-7 illustrate different embodiments of the invention which are applicable without discrimination to any type of glass drawing process, whether it employs a draw bar or not, or a debiteuse as in the Fourcault process and in particular to any one of the drawing processes shown in FIGS. 1 and 2.

Figure 8:
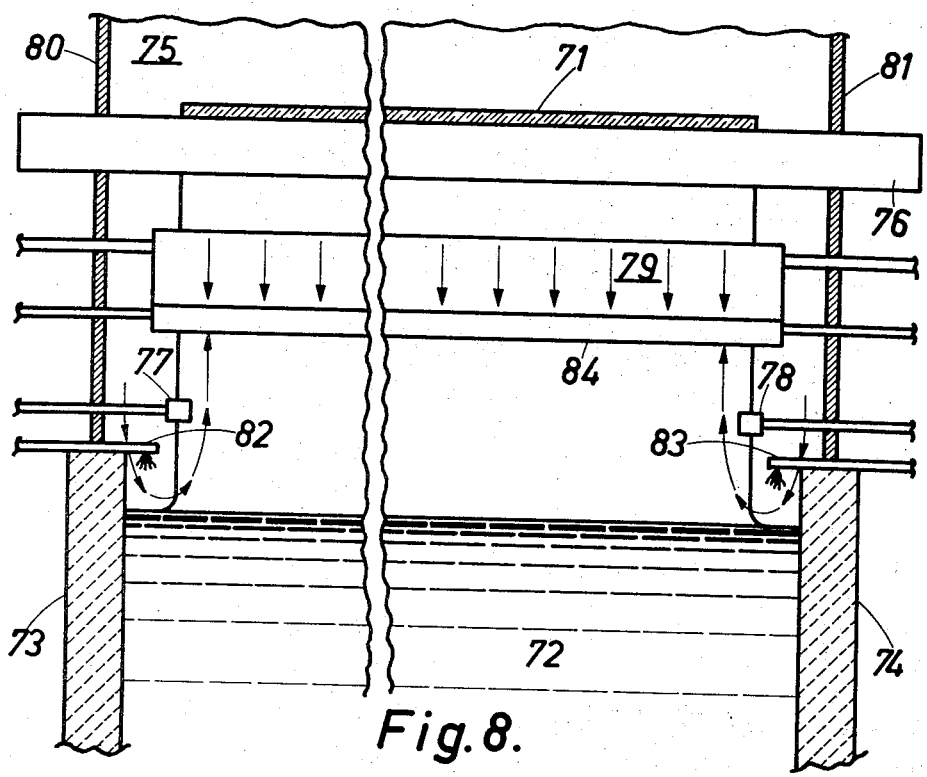
FIG. 8 is a cross sectional, elevational end view taken along a plane parallel to the glass ribbon being drawn, showing a drawing chamber similar to that shown in FIG. 2 and illustrating still a further embodiment of means for carrying out the invention.

FIG. 8 is a vertical cross section of a drawing chamber similar to that shown in FIG. 2, between the L-block and the principal cooler. The glass ribbon 71 is drawn from a bath of molten glass 72 which is limited laterally by walls 73 and 74. After vertical drawing of the ribbon 71 in the drawing chamber 75, the ribbon is bent substantially into a horizontal position by a bending roller 76 and then passes toward the horizontal annealing lehr, not shown and located in front the plane of FIG. 8. The drawing chamber includes, in a standard manner for this type of process, edge rollers 77 and 78 maintaining the width of the ribbon 71 constant, principal coolers of which only the one cooler 79 is visible, and lateral walls 80 and 81 situated above the walls 73 and 74. It also includes burners 82 and 83 disposed in a manner to direct hot gases toward the molten glass and entraining generally cooler glasses existing in the immediate proximity of lateral walls 73 and 74. These gases also reheat the cooler glass supplying the edges of the ribbon. At the lower part of the cooler 79 there is disposed a channel 84 of the type described above.

The cold gaseous currents flowing along the lateral walls 80, 81, 73 and 74 are reheated and deflected by the burners 82 and 83 and then flow upwardly toward the channel 84 which withdraws them.

In all of the embodiments, it is possible to utilize means for deflecting and withdrawing the currents which do not necessarily extend across the entire width of the glass ribbon. It is also possible to utilize one or more sections of such elements at different locations distributed across the width of the ribbon. Preferably, however, the various sections are disposed end to end. Thus, by a channel composed of several sections it is possible to withdraw the gaseous currents which have thus been deflected with different intensitites along the width of the glass ribbon. In effect, the different sections can be separately connected to suction means and it is thus possible to adapt, section by section, the suction intensity to the intensity of the deflected gaseous current.

That which has just been stated regarding the division of withdrawal means into several sections is equally applicable to the means for deflecting the gaseous currents. Their division into several sections also permits acting in a differential manner along the width of the ribbon.

It will be understood that the above description of the present invention is susceptible to various modifications, changes and adaptations, and the same are intended to be comprehended within the meaning and range of equivalents of the appended claims.

We claim:

1. In a process for fabricating flat glass by drawing glass in the form of a continuous ribbon from a mass of molten glass, through a drawing chamber where the ribbon solidifies and leaves the drawing chamber through an exit opening, the improvement comprising:

transmitting energy to the gas in the chamber in at least one zone of the chamber which is contiguous with a boundary wall or to a cool element in the drawing chamber and/or located along the trajectory of gas which descends or has descended into the chamber as a result of its relatively low temperature, for promoting the displacement of such gas toward at least one higher level zone; and withdrawing such gas from the chamber at at least one location situated within the chamber other than the glass ribbon exit opening, with a withdrawal force sufficient for extracting gas from the higher level zone.

2. A process as defined in claim 1, wherein said step of withdrawing is carried out by exerting a withdrawal force at the higher level zone.

3. A process as defined in claim 1, wherein said step of transmitting energy is carried out by transmitting thermal energy to gas in the drawing chamber for promoting its displacement toward the higher level zone, the thermal energy being produced by burning a combustible gas or by the action of electric resistance heating means.

4. A process as defined in claim 1, wherein said step of transmitting energy is carried out by blowing gas into the drawing chamber so as to promote such a displacement of gas toward the higher level zone as a result of the kinetic energy developed by the gas blowing into the chamber.

5. A process as defined in claim 1, wherein the drawing chamber contains at least one cooler and said step of transmitting energy is carried out along the one face of the cooler.

6. A process as defined in claim 5 wherein said step of transmitting energy is carried out in such a manner as to produce an ascending displacement of gas along at least one face of the cooler directed toward the glass ribbon.

7. A process as defined in claim 5 wherein said step of withdrawing is carried out by exerting a withdrawal force near or above the upper part of the cooler for extracting from the drawing chamber gas which has been subjected to such ascending displacement along such cooler.

8. A process as defined in claim 5 wherein said step of withdrawing is carried out by producing a withdrawing force adjacent or below the lower part of such cooler for causing gas which has been subjected to such ascending displacement along one face of the cooler to a subsequent descending displacement along the opposite face of the cooler and for causing such gas to be withdrawn from the chamber.

9. A process as defined in claim 5 wherein said step of withdrawing is carried out by exerting a withdrawal force sufficient for extracting from the drawing chamber gas which has undergone such displacement along one face of such cooler and gas which has followed a descending trajectory along an outer wall of the chamber.

10. A process as defined in claim 1 in which the chamber includes at least one lower cooler situated in the lower part of the drawing chamber and at least one upper cooler situated in an upper part of the drawing chamber at one side of the path of travel of the ribbon through the chamber, and wherein said step of transmitting energy is carried out for provoking the displacement of gas toward at least one higher level zone along at least one face of the lower cooler and along one face of the upper cooler, and said step of withdrawing is carried out for simultaneously extracting at such location gas which has been displaced along both the upper and lower coolers.

11. In apparatus for fabricating flat glass and including means for drawing a continuous ribbon of glass from a mass of molten glass, through a drawing chamber in which the ribbon solidifies and leaves the drawing chamber through an exit opening, the improvement comprising means for transmitting energy to the gas in the chamber in at least one zone of said chamber adjacent a boundary wall thereof or adjacent a cool element in the drawing chamber and/or located along the trajectory of gas which descends or has descended into the chamber as a result of its relatively low temperature, for promoting the displacement of such gas toward at least one higher level zone; and withdrawing means for withdrawing gas from said chamber, said withdrawing means comprising an orifice other than the glass ribbon exit opening disposed for extracting the gas from such higher level zone.

12. An arrangement as defined in claim 11, wherein said energy transmitting means comprise means arranged for blowing gas into said chamber.

13. An arrangement as defined in claim 11, wherein the chamber contains a cooler, and said energy transmitting means are arranged for promoting such displacement of gas upwardly along one face of the cooler.

14. An arrangement as defined in claim 13, wherein said energy transmitting means are arranged for producing such displacement of gas along that face of the cooler which is directed toward the ribbon.

15. An arrangement as defined in claim 13, wherein said withdrawing means comprise an orifice situated alongside or above the upper part of such cooler.

16. An arrangement as defined in claim 13, wherein said energy transmitting means are arranged for promoting such displacement along one face of such cooler and said withdrawing means are disposed for promoting a subsequent displacement of such gas along the opposite face of the cooler.

17. An arrangement as defined in claim 11, wherein the chamber contains, along at least one side of the ribbon drawing path, a lower cooler situated in the lower part of the chamber and an upper cooler situated in the upper part of the drawing chamber, and wherein said energy transmitting means are disposed for promoting such displacement of gas upwardly along one face of the lower cooler and upwardly along one face of the lower cooler, and said withdrawing means comprise an orifice located for removing quantities of gas which have been thus displaced along the upper and lower coolers.

* * * * *